United States Patent
Metzler et al.

(10) Patent No.: US 10,055,381 B2
(45) Date of Patent: *Aug. 21, 2018

(54) CONTROLLER AND METHOD FOR MIGRATING RDMA MEMORY MAPPINGS OF A VIRTUAL MACHINE

(71) Applicant: International Business Machines Corporation, Armonk, NY (US)

(72) Inventors: Bernard Metzler, Zurich (CH); Jonas Pfefferle, Fällanden (CH); Patrick Stuedi, Zurich (CH); Animesh K. Trivedi, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 14/948,306

(22) Filed: Nov. 21, 2015

(65) Prior Publication Data
US 2016/0267052 A1 Sep. 15, 2016

Related U.S. Application Data

(63) Continuation of application No. 14/657,015, filed on Mar. 13, 2015, now Pat. No. 9,904,627.

(51) Int. Cl.
*G06F 15/167* (2006.01)
*H04L 29/08* (2006.01)

(52) U.S. Cl.
CPC .................................. *G06F 15/167* (2013.01)

(58) Field of Classification Search
None
See application file for complete search history.

(56) References Cited

U.S. PATENT DOCUMENTS

| 7,552,298 B2 | 6/2009 | Bestler |
| 7,565,454 B2 | 7/2009 | Zuberi |

(Continued)

FOREIGN PATENT DOCUMENTS

| CN | 103530167 | 1/2014 |
| CN | 103763173 | 4/2014 |

(Continued)

OTHER PUBLICATIONS

Wei Huang et al, Nomad: Migrating OS-Bypass Networks in Virtual Machines. Dhabaleswar Panda VEE '07 Proceedings of the 3rd international conference on Virtual execution environments pp. 158-168.

(Continued)

*Primary Examiner* — Sargon N Nano
*Assistant Examiner* — Christopher B Robinson
(74) *Attorney, Agent, or Firm* — Daniel P. Morris; Otterstedt, Ellenbogen & Kammer, LLP

(57) ABSTRACT

An RDMA-capable network interface controller provides an RDMA access to a physical memory using multiple mapping tables; the physical memory includes a plurality of physical memory regions, at least some of which are associated with a virtual memory region. A mapping unit is configured to map memory region identifiers, each of which is adapted to identify a virtual memory region and an associated physical memory region, to virtual memory regions and to the associated physical memory regions based on a mapping table selected from multiple mapping tables based on a network identifier. Each of the mapping tables is indexed using a plurality of memory region identifiers, each associated with a virtual memory region and a physical memory region. A processing unit is configured to receive an access request from a client for accessing one of the physical memory regions associated with a virtual memory region.

6 Claims, 5 Drawing Sheets

(56) References Cited

U.S. PATENT DOCUMENTS

| | | |
|---|---|---|
| 7,756,943 B1 | 7/2010 | Wong |
| 2003/0177332 A1 | 9/2003 | Shiota |
| 2010/0083247 A1 | 4/2010 | Kanevsky |
| 2010/0274876 A1* | 10/2010 | Kagan ............... G06F 12/1072 709/221 |
| 2011/0270945 A1 | 11/2011 | Shiga et al. |
| 2014/0007100 A1 | 1/2014 | Gu |
| 2014/0129664 A1 | 5/2014 | McDaniel |
| 2014/0164718 A1* | 6/2014 | van Schaik ............ G06F 9/544 711/150 |
| 2014/0201451 A1 | 7/2014 | Dube |
| 2015/0178242 A1 | 6/2015 | Snyder |
| 2015/0263887 A1* | 9/2015 | Sajeepa ............... H04L 41/0803 709/220 |

FOREIGN PATENT DOCUMENTS

| | | |
|---|---|---|
| CN | 103942087 | 7/2014 |
| EP | 1552409 | 7/2005 |
| WO | WO2016109458 | 7/2016 |

OTHER PUBLICATIONS

Wei Huang et al, High Performance Virtual Machine Migration With RDMA Over Modern Interconnects. Cluster Computing, 2007 IEEE International Conference on Sep. 17-20, 2007.

Bernard Metzler et al. unpublished U.S. Appl. No. 14/657,015, filed Mar. 13, 2015, Controller and Method for Migrating RDMA Memory Mappings of a Virtual Machine, pp. 1-27 plus 5 sheets drawings.

List of IBM Patents or Applications Treated As Related.

Intellectual Property Office of the United Kingdom, Search Report in UK Counterpart Patent Application GB1603943.0, dated Aug. 8, 2016, pp. 1-5.

Chinese Patent Office, Office Action and Search Report in Counterpart Chinese Application 201610134805.4, dated Apr. 24, 2018, pp. 1-11 (in Chinese; believed significance of references can be appreciated by alphanumeric categorization).

* cited by examiner

CONTROLLER AND METHOD FOR MIGRATING RDMA MEMORY MAPPINGS OF A VIRTUAL MACHINE

CROSS-REFERENCE TO RELATED APPLICATION

This application is a continuation of U.S. patent application Ser. No. 14/657,015 filed 13 Mar. 2015, the complete disclosure of which is expressly incorporated herein by reference in its entirety for all purposes.

BACKGROUND

Embodiments of the invention relate to an RDMA-capable network interface controller and to a method for providing a mechanism to migrate RDMA memory mappings of a virtual machine. The mappings, generated via memory registration calls, are transferred from a RDMA-capable network interface controller on a physical machine to another controller when the virtual machine is migrated from the physical machine to another physical machine.

In modern network systems, remote direct memory access (RDMA) is used for providing direct memory access from the memory of one physical machine, for example a computer, into that of another physical machine using network controllers, and without involving either one's operating system. This permits high-throughput and low-latency networking at a negligible CPU load. But RDMA has specific requirements and thus exposes applications in a distributed setting to network resources tied to a physical machine and network controller such as a Steering Tag (STag), and associated registered virtual and physical memory regions etc. These STags are necessary for accessing physical memory regions of a physical machine but are only valid for a particular network interface controller device, on a particular physical machine. These STags are distributed and used by all peers or clients in a networked environment. In a consolidated distributed environment, like a cloud network, workloads involving RDMA accesses are run inside a virtual machine (VM). However, when a virtual machine is migrated from a physical host to another, STags and memory mappings of the previous physical host or machine are not valid on the new host or machine. Thus, peers who have old STags must discard the old STags and learn about new STags on the newly migrated machine. This may be a time consuming and complicated process that may result in a performance loss for workloads.

U.S. Pat. No. 7,565,454 B2 discloses a method for transferring control between a first network interface and a second network interface within the same host with reference to STags.

Accordingly, it is an aspect of the present invention to provide an improved way of migrating memory mappings of a virtual machine from a RDMA-capable network controller to another when the virtual machine is migrated between physical machines and of using the migrated memory mappings when accessing memory regions.

SUMMARY

According to a first aspect, an RDMA-capable network interface controller for providing an RDMA access to a physical memory of a physical machine using multiple mapping tables is suggested. The physical memory includes a plurality of physical memory regions, at least some of the physical memory regions being associated with a virtual memory region of a virtual machine running on the physical machine. The network interface controller comprises a mapping unit being configured to map memory region identifiers, each of which is adapted to identify a virtual memory region and an associated physical memory region, to virtual memory regions and to the associated physical memory regions based on a mapping table, wherein the mapping unit is configured to select the mapping table from multiple mapping tables based on a network identifier of the virtual machine being included in the access request, each of the mapping tables being indexed using a plurality of memory region identifiers, each of the plurality of memory region identifiers being associated with one of the virtual memory regions and one of the physical memory regions, and a processing unit being configured to receive an access request from a client for accessing one of the physical memory regions being associated with one of the virtual memory regions of the virtual machine, wherein the access request includes one of the plurality of memory region identifiers identifying the virtual memory region and the associated physical memory region, wherein the processing unit is further configured to provide access for the client to the virtual memory region and the associated physical memory region using the information contained in the selected mapping table and using the received memory region identifier.

According to an embodiment, the network interface controller is software-implemented and/or hardware-implemented.

According to a further embodiment, the access request is a receive and/or transmit access request.

According to a further embodiment, the network identifier is a unique network wide identifier.

According to a further embodiment, the network interface controller further comprises a memory registration logging unit being configured to generate a memory registration log including a memory region identifier and an associated virtual memory region.

According to a further embodiment, the network interface controller is configured to transfer the generated memory registration log to another physical machine.

According to a further embodiment, the mapping unit is configured to generate a new mapping table based on the generated memory registration log.

According to a further embodiment, when the virtual machine is migrated from another physical machine to the physical machine, the mapping unit is configured to receive a memory registration log from the other physical machine together with migration information, and wherein the mapping unit is configured to generate a new mapping table based on the received memory registration log.

According to a further embodiment, the mapping unit is configured to generate the new mapping table for the network identifier of the migrated virtual machine using the entries of the received memory registration log, to replay the received memory registration log and to replace, for each entry of the mapping table, the associated physical memory region of the other physical machine with the physical memory region of the physical machine.

According to a further embodiment, the mapping unit is configured to generate the new mapping table by adding an entry based on the received memory registration log when an access request from a client is received.

Any embodiment of the first aspect may be combined with any embodiment of the first aspect to obtain another embodiment of the first aspect.

According to a second aspect, a physical machine is suggested. The physical machine comprises a physical memory including a plurality of physical memory regions, at least one virtual machine running on the physical machine, and a network interface controller of the first aspect. The plurality of physical memory regions of the physical machine are mapped to virtual memory regions of the virtual machine by means of a virtual memory mapping mechanism.

According to a third aspect, a network system is suggested. The network system comprises at least two physical machines of the second aspect. A virtual machine running on a first physical machine of the at least two physical machines is configured to be migrated from the first physical machine to a second physical machine of the at least two physical machines.

According to an embodiment, when the virtual machine is migrated from the first physical machine to the second physical machine, the network interface controller of the second physical machine is configured to receive, together with information of the virtual machine, a memory registration log.

According to a further embodiment, the virtual machine is configured to be migrated from the second physical machine to the first physical machine.

According to a fourth aspect, a method for providing an RDMA access to a physical memory of a physical machine using multiple mapping tables is suggested. The physical memory includes a plurality of physical memory regions, at least some of the physical memory regions being associated with a virtual memory region of a virtual machine running on the physical machine.

The method comprises the following steps: mapping memory region identifiers, each of which is adapted to identify a virtual memory region and an associated physical memory region, to virtual memory regions and to the associated physical memory regions based on a mapping table, wherein the mapping table is selected from multiple mapping tables based on a network identifier of the virtual machine, each of the mapping tables being indexed using a plurality of memory region identifiers, each of the plurality of memory region identifiers being associated with one of the virtual memory regions and one of the physical memory regions, receiving an access request from a client for accessing one of the physical memory regions being associated with one of the virtual memory regions of the virtual machine, wherein the access request includes one of the plurality of memory region identifiers identifying the virtual memory region and the associated physical memory region, and providing access for the client to the virtual memory region and the associated physical memory region using the information contained in the selected mapping table and using the received memory region identifier.

According to a fifth aspect, the invention relates to a computer program comprising a program code for executing at least one step of the method of the fourth aspect for providing an RDMA access to a physical memory of a physical machine when run on at least one computer.

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION

Figure 1:
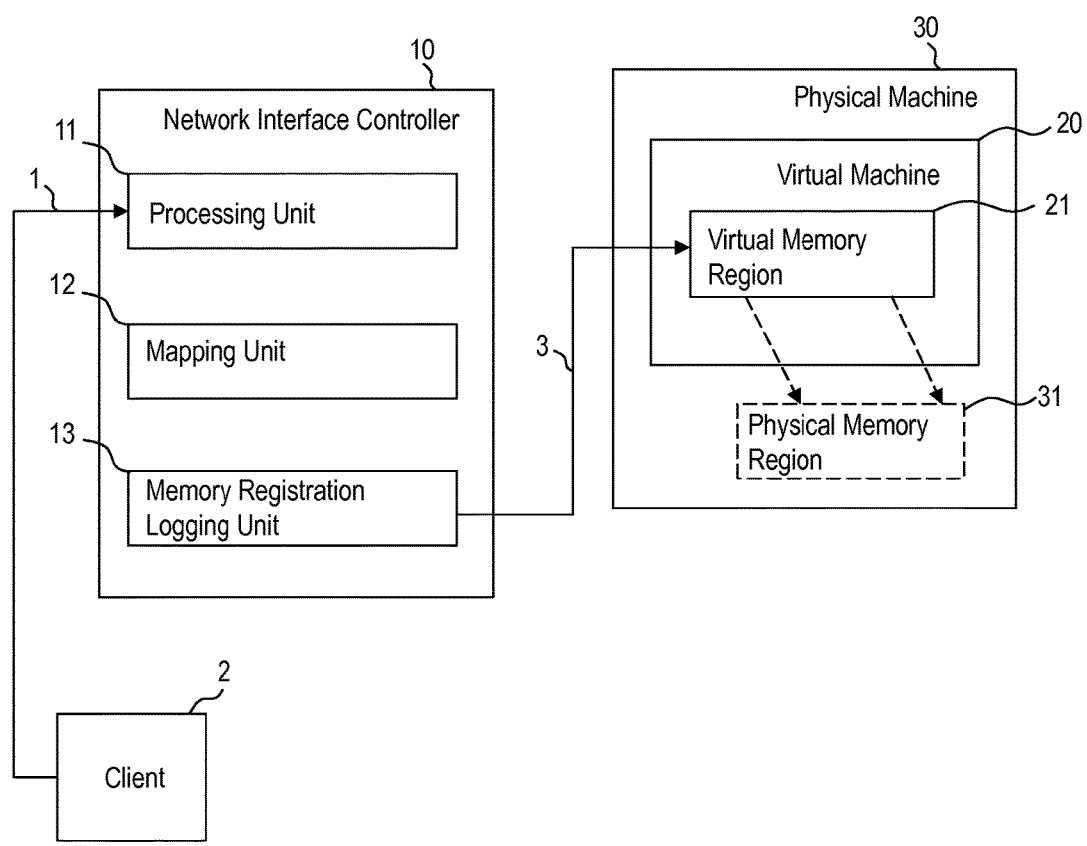
FIG. 1 shows an embodiment of an RDMA-capable network interface controller for providing an RDMA access to a physical memory of a physical machine.

For an RDMA access, a memory region is identified by presenting a memory identifier, which is associated with a virtual address region (herein also called virtual memory region) and physical memory regions of a physical machine. The memory identifier and its memory associations are generated explicitly by performing a memory registration operation, also called memory registration call, prior to an RDMA access. These associations that include memory identifiers, virtual memory regions, physical memory regions, and implementation specific metadata etc., are stored in a mapping table in the network interface controller 10, which is shown in FIG. 1 in detail.

Figure 2:
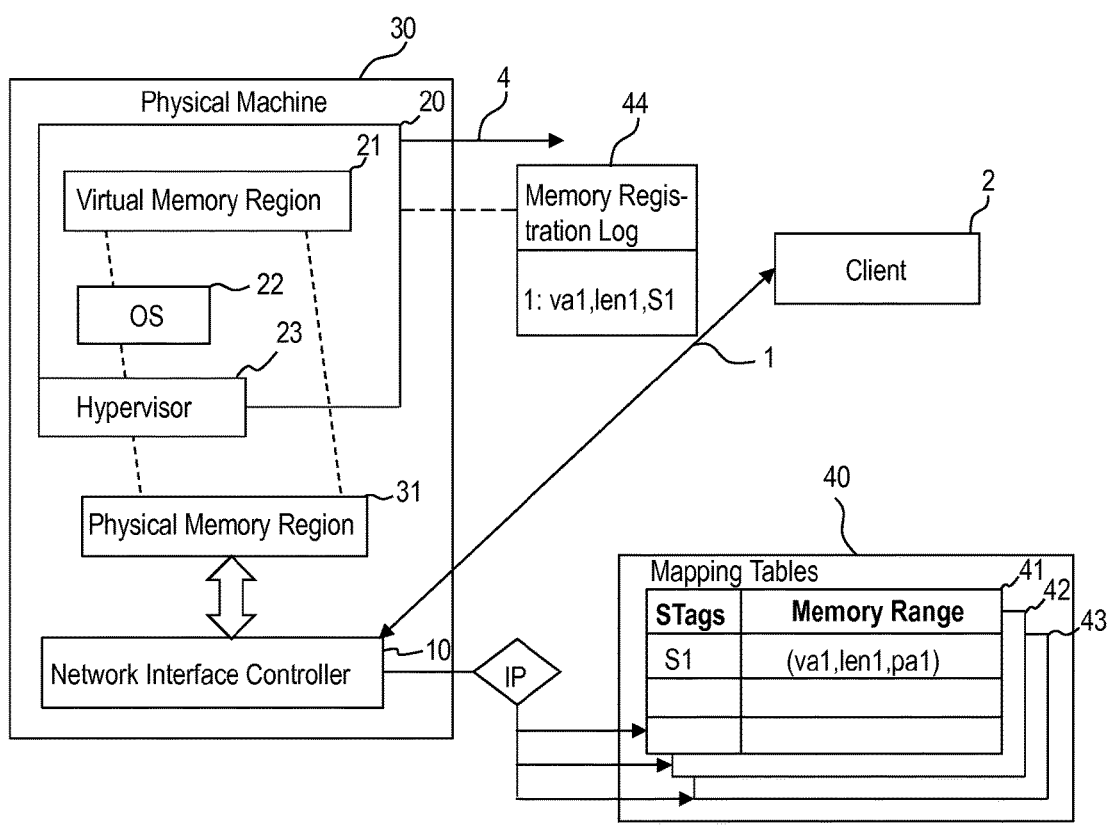
FIG. 2 shows an embodiment of a virtual machine interacting with the RDMA-capable network interface controller of FIG. 1.
Figure 3:
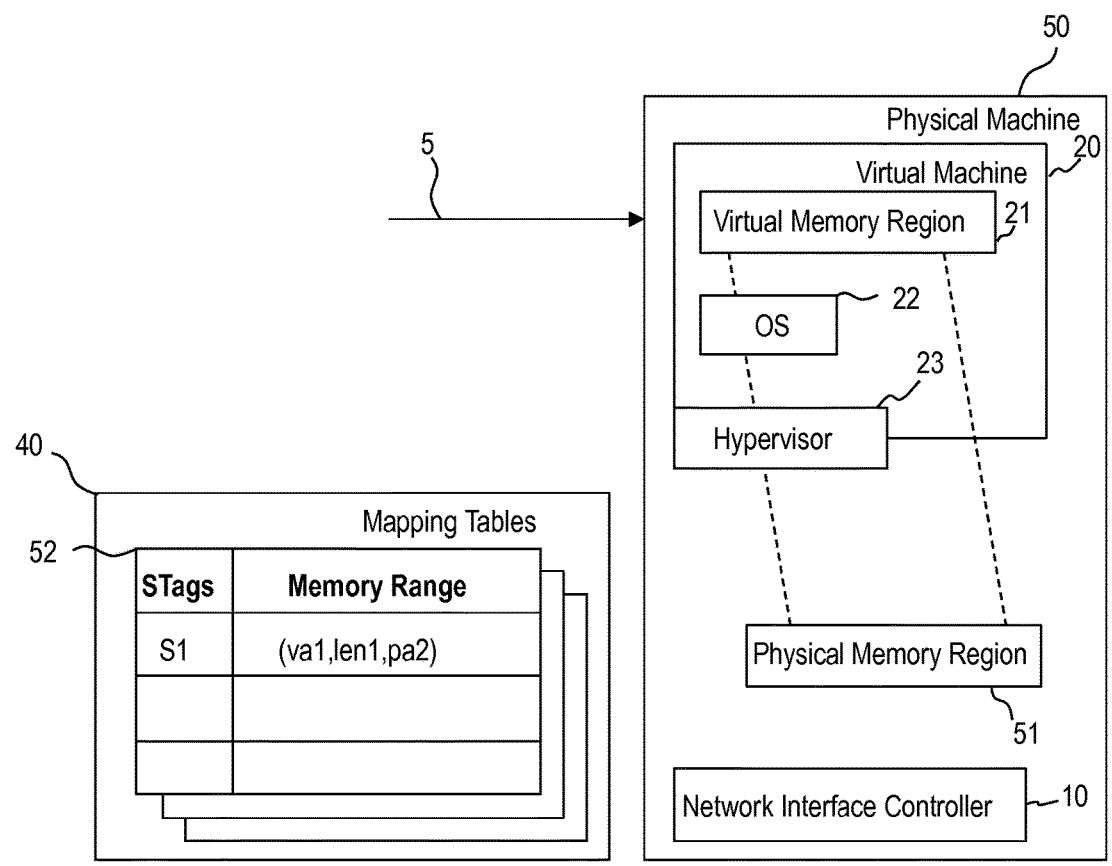
FIG. 3 shows an embodiment of the virtual machine of FIG. 2 after migration from one physical machine to another physical machine.

Embodiments as shown for example in FIGS. 2 and 3 are directed to a design and method of the herein described RDMA-capable network interface controller that is able to update physical memory regions in a mapping table entry, while retaining the previously generated memory identifier and associated virtual memory region. This capability is used to preserve RDMA-workload visible memory credentials (i.e. memory identifier and virtual memory region) within a virtual machine, while updating the associated physical memory regions during a virtual machine migration process.

In one embodiment, which is shown in FIG. 2, to keep track of memory registration operations, a memory registration log is maintained with help of the higher-level software e.g., operating system, driver etc., or the controller itself. The log is transferred as a part of the virtual machine state that is transferred from an old physical machine host to a new physical machine host.

To avoid memory identifier conflicts, which happens when the mapping table of the RDMA controller of the new physical host already contains similar memory identifier entries as that of the virtual machine's, the herein described RDMA network interface controller contains multiple mapping tables, and the correct table is selected using the network identifier (e.g. IP address) of the virtual machine. Hence, the herein described network interface controller resolves RDMA accesses to physical memory using the mapping table that belongs to a network identifier of the virtual machine.

While migrating the virtual machine, the mapping table of the virtual machine is deleted on the RDMA network interface controller of the old physical host. A new mapping table is created on the network interface controller of the new physical host, for example by replaying the memory registration log, and updating the physical regions of mapping entries with the new physical memory regions of the new physical machine host. This mechanism is based on the idea that a network identifier of a virtual machine is a network-wide unique identifier, and the RDMA-capable network interface controller is capable of receiving such log, creating and destroying mapping tables, refreshing physical memory regions entries, and select the correct mapping table for access using the network identifier presented in an RDMA request.

The network interface controller and embodiments thereof will now be described in greater detail with reference to the figures.

FIG. 1 shows an RDMA-capable network interface controller 10 for providing an RDMA access to a physical memory of a physical machine 30 using multiple mapping tables. The physical memory includes a plurality of physical memory regions (only one physical memory region 31 is shown in FIG. 1). One 31 of the physical memory regions is associated with a virtual memory region 21 of a virtual machine 20 running on the physical machine 30.

The network interface controller 10 comprises a processing unit 11, a mapping unit 12, and a memory registration logging unit 13. The network interface controller 10 can be a hardware-implemented network interface controller but may also be implemented in software. In particular, the respective units of the network interface controller 10, e.g. the mapping unit 12, may be implemented in hardware and/or in software. If said unit is implemented in hardware, it may be embodied as a device, e.g. as a processor or as a part of a system, e.g. a computer system. If said unit is implemented in software it may be embodied as a computer program product, as a function, as a routine, as a program code or as an executable object.

During a memory registration call, which precedes an access request 1, a memory region identifier, for example a Steering Tag or STag, is generated by an RDMA device like the network interface controller 10. An STag uniquely identifies a virtual memory region 21 (by a virtual address va1 and a length len1) on a virtual machine 20 via an RDMA capable network interface controller 10, also called NIC or RNIC. An STag is used for encoding a base address (va1) and length (len1) of the virtual memory region 21, identifying the physical memory region 31 that is attached to the virtual memory region 21 and checking access permissions. However, STags are device specific identifiers. An STag s1 generated on one device, like an RNIC, is not valid for another device on another physical machine 50. Thus, accessing the STag s1 on another RNIC on another physical machine 50 will generate a fault as the mapping is not valid for the memory regions on the other physical machine 50. In this context, it should be noted that a network interface controller 10 is associated with one device, i.e. for one physical machine 30.

To avoid such faults, the herein described network interface controller 10 is capable of transferring memory mappings between physical machines when migrating a virtual machine 20 from one physical machine 30 or host to another physical machine 50 (see FIG. 3) or host. The different units of the network interface controller 10 will be described in the following.

The processing unit 11 is configured to receive an access request 1, which can be a receive or transmit request, from a client 2 for accessing the physical memory region 31 being associated with the virtual memory region 21 of the virtual machine 20. The client 2 can be remote or located directly at the network interface controller 10. The access request 1 includes a memory region identifier S1 (see FIG. 2), like a steering tag, identifying the virtual memory region 21 and the associated physical memory region 31. This identification can be explicit or implicit. This means that the memory region identifier S1 can either have a direct reference to the virtual memory region 21 or the physical memory region 31 or both. In any case, the memory region identifier S1 identifies both regions, either directly or via the respective other memory region.

The mapping unit 12 is configured to map the memory region identifier S1 to the virtual memory region 21 and to the associated physical memory region 31 based on a mapping table 41. The mapping unit 12 selects the mapping table 41 from multiple mapping tables 40 based on a network identifier IP of the virtual machine 20. The network identifier IP is a unique network wide identifier for identifying the virtual machine 20. This can be for example an IP address, a global identifier, a MAC address, or any other identifier.

It should be noted that one virtual machine 20 can have a plurality of network identifiers IP. In such a case, the network interface controller 10 may have a mapping table for each of the network identifiers, wherein each mapping table of the same virtual machine will contain identical entries.

If the network identifier IP of the virtual machine 20 is changed, the same mapping table would be chosen as before, but based on the new network identifier IP. To choose the same mapping table based on the new network identifier IP, metadata used for selecting the mapping table may be updated in the network interface controller 10 accordingly.

The network identifier IP is included in the access request 1. One of the mapping tables 40 is selected based on the network identifier IP. Each of the mapping tables 40 is indexed using a plurality of memory region identifiers, wherein each of the plurality of memory region identifiers is associated with a virtual memory region 21 and a physical memory region 31.

After the mapping, the processing unit 11 provides access 3 for the client 2 to the virtual memory region 21 and the associated physical memory region 31 using the information contained in the selected mapping table and using the received memory region identifier.

The migration of the virtual machine 20 from one physical machine 30 to another virtual machine 40 as well as the generation of the mapping tables 40 will be described with reference to FIGS. 2 and 3.

The virtual machine 20 running on the physical machine 30 has a virtual memory region 21, also called application buffer, which is associated with the physical memory region 31. On the virtual machine 20, an operating system 22 (OS) is running. Further, a hypervisor 23 is provided which serves as a layer between the virtual machine 20 and the physical machine 30. A network interface controller 10 is provided for processing access requests 1 from clients 2.

When a client 2 wants to access the virtual memory region 21, a memory registration call is generated as a preparation for the access request 1. Such memory registration calls are logged in a memory registration log 44. This logging is done within the memory registration logging unit 13. Each memory registration call adds an entry to the memory registration log 44. One entry includes a memory region identifier S1 and an associated virtual memory region 21, for example indicated by address va1 and length len1. Also de-registration calls can be used for removing entries from the memory registration log 44.

The network interface controller 10 can either directly comprise the memory registration logging unit 13, as hardware or software implemented unit. Or, the memory registration logging unit 13 can be implemented as part of the driver of the RDMA network interface controller 10.

The network interface controller 10 receives the access request 1 and selects one mapping table 41 of the multiple mapping tables 40. This is done using the IP of the virtual machine 20 included in the access request 1. After this, the mapping of the virtual memory region 21 to the physical memory region 31 using the memory region identifier S1 included in the access request 1 can be performed as described above using the correctly selected mapping table 41.

The memory region identifier S1 can be forwarded to all clients being present in the network.

However, when the virtual machine 20 is migrated 4 from the physical machine 30 to the physical machine 50, the virtual address and length of the virtual machine 20 remains but the underlying physical memory region 51 is different. However, as the network interface controller 10 (a separate network interface controller 10 is assigned to each physical machine 30, 50) selects a mapping table 40 based on the corresponding IP address of the virtual machine 20, the memory region identifier S1 used by the client 2 will be mapped to the new physical memory region 51.

When the virtual machine 20 is migrated, the mapping unit 12 receives the memory registration log 44 from the former physical machine 30 together with migration information. Based on the memory registration log 44, the mapping unit 12 generates a new mapping table 52 which is added to the multiple mapping tables 40.

The new mapping table 52 can be generated using the entries of the received memory registration log 44 by replaying the received memory registration log 44 and by replacing for each entry of the mapping table 41, the associated physical memory region 31 of the other physical machine 30 with the physical memory region 51 of the physical machine 50. In the mapping tables 40, the physical memory region 31 is denoted as pa1 and the physical memory region 51 is denoted as pa2.

In another embodiment, the mapping unit 12 only generates new entries for the new mapping table 52 when an access request 1 from a client 2 is received.

Figure 4:
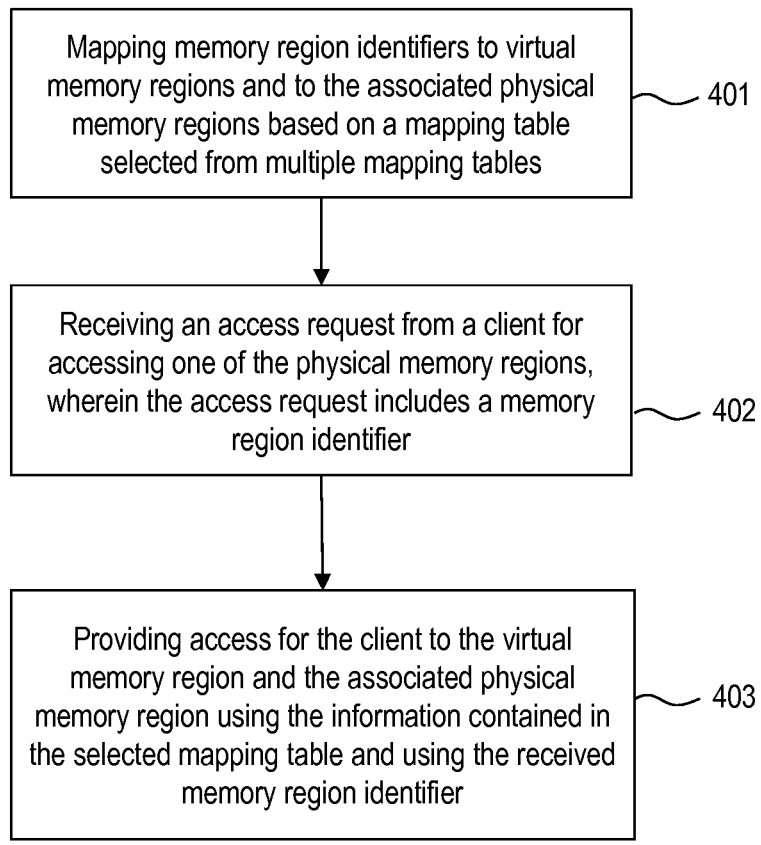
FIG. 4 shows an embodiment of a sequence of method steps for providing an RDMA access to a physical memory of a physical machine.

FIG. 4 shows an embodiment of a sequence of method steps for providing an RDMA access to a physical memory of a physical machine. The method of FIG. 4 has the following steps 401-403.

In step 401, memory region identifiers, each of which is adapted to identify a virtual memory region and an associated physical memory region, are mapped to virtual memory regions and to the associated physical memory regions based on a mapping table. The mapping table is selected from multiple mapping tables based on a network identifier of the virtual machine, each of the mapping tables being indexed using a plurality of memory region identifiers, each of the plurality of memory region identifiers being associated with one of the virtual memory regions and one of the physical memory regions.

In step 402, an access request is received from a client for accessing one of the physical memory regions being associated with one of the virtual memory regions of the virtual machine. The access request includes one of the plurality of memory region identifiers identifying the virtual memory region and the associated physical memory region.

In step 403, access is provided for the client to the virtual memory region and the associated physical memory region using the information contained in the selected mapping table and using the received memory region identifier.

It should be noted that the order of the steps can vary and can also be performed in a different order.

Computerized devices may be suitably designed for implementing embodiments of the present invention as described herein. In that respect, it may be appreciated that the method described herein is largely non-interactive and automated. In exemplary embodiments, the method described herein may be implemented either in an interactive, partly-interactive or non-interactive system. The method described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 4 may be implemented in software, as an executable program, the latter executed by suitable digital processing devices. More generally, embodiments of the present invention may be implemented wherein general-purpose digital computers, such as personal computers, workstations, etc., are used.

Figure 5:
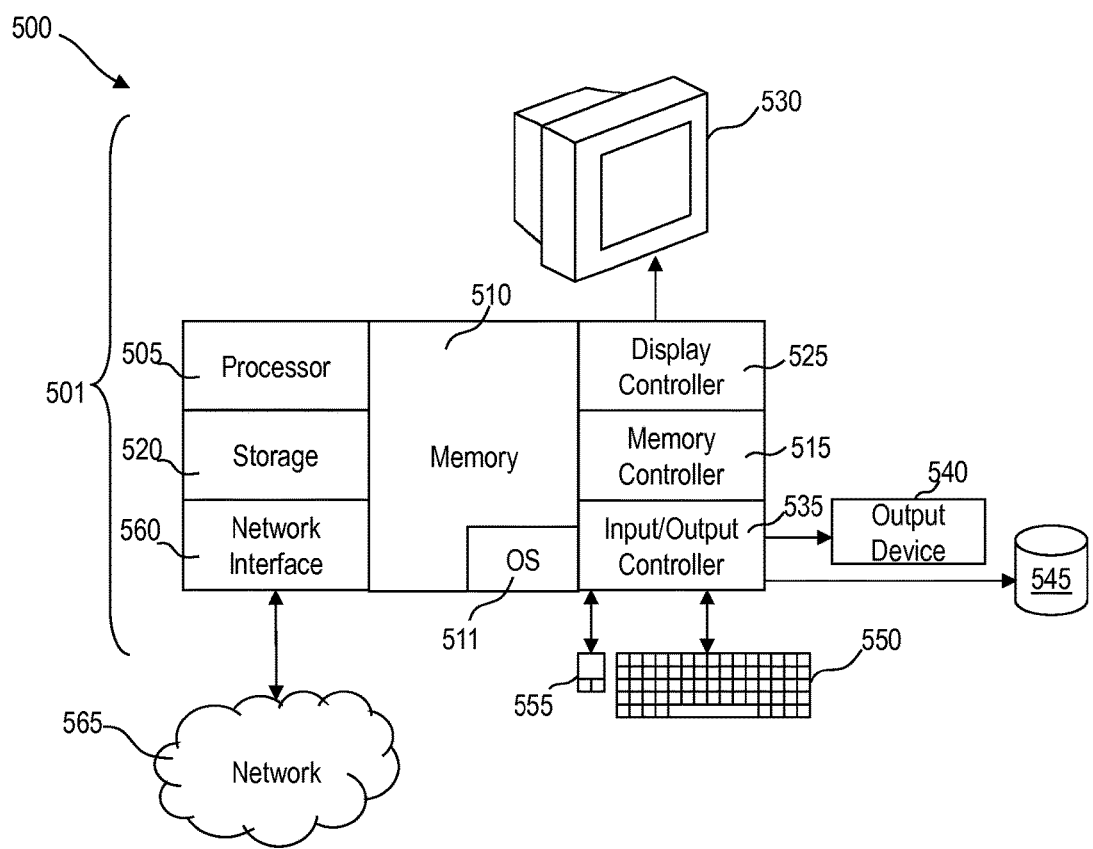
FIG. 5 shows a schematic block diagram of an embodiment of a system adapted for performing the method for providing an RDMA access to a physical memory of a physical machine.

For instance, the system 500 depicted in FIG. 5 schematically represents a computerized unit 501, e.g., a general-purpose computer. In exemplary embodiments, in terms of hardware architecture, as shown in FIG. 5, the unit 501 includes a processor 505, memory 510 coupled to a memory controller 515, and one or more input and/or output (I/O) devices 540, 545, 550, 555 (or peripherals) that are communicatively coupled via a local input/output controller 535. Further, the input/output controller 535 may be, but is not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 505 is a hardware device for executing software, particularly that stored in memory 510. The processor 505 may be any custom made or commercially available processor, a central processing unit (CPU), an auxiliary processor among several processors associated with the computer 501, a semiconductor based microprocessor (in the form of a microchip or chip set), or generally any device for executing software instructions.

The memory 510 may include any one or combination of volatile memory elements (e.g., random access memory) and nonvolatile memory elements. Moreover, the memory 510 may incorporate electronic, magnetic, optical, and/or other types of storage media. Note that the memory 510 may have a distributed architecture, where various components are situated remote from one another, but may be accessed by the processor 505.

The software in memory 510 may include one or more separate programs, each of which comprises an ordered listing of executable instructions for implementing logical functions. In the example of FIG. 5, the software in the memory 510 includes method described herein in accordance with exemplary embodiments and a suitable operating system (OS) 511. The OS 511 essentially controls the execution of other computer programs, such as the method as described herein (e.g., FIG. 4), and provides scheduling, input-output control, file and data management, memory management, and communication control and related services.

The method described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 510, so as to operate properly in connection with the OS 511. Furthermore, the method may be written as an object oriented programming language, which has classes of data and methods, or a procedure programming language, which has routines, subroutines, and/or functions.

Possibly, a conventional keyboard 550 and mouse 555 may be coupled to the input/output controller 535. Other I/O devices 540-555 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 535 for further processing. Sensor nodes are ideally small, consume low energy, are autonomous and operate unattended.

In addition, the I/O devices 540-555 may further include devices that communicate both inputs and outputs. The system 500 may further include a display controller 525 coupled to a display 530. In exemplary embodiments, the system 500 may further include a network interface or transceiver 560 for coupling to a network 565.

The network 565 transmits and receives data between the unit 501 and external systems. The network 565 is possibly implemented in a wireless fashion, e.g., using wireless protocols and technologies, such as WiFi, WiMax, etc. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 565 may also be an IP-based network for communication between the unit 501 and any external server, client and the like via a broadband connection. In exemplary embodiments, network 565 may be a managed IP network administered by a service provider. Besides, the network 565 may be a packet-switched network such as a LAN, WAN, Internet network, etc.

If the unit 501 is a PC, workstation, intelligent device or the like, the software in the memory 510 may further include a basic input output system (BIOS). The BIOS is stored in ROM so that the BIOS may be executed when the computer 501 is activated.

When the unit 501 is in operation, the processor 505 is configured to execute software stored within the memory 510, to communicate data to and from the memory 510, and to generally control operations of the computer 501 pursuant to the software. The method described herein and the OS 511, in whole or in part are read by the processor 505, typically buffered within the processor 505, and then executed. When the method described herein (e.g. with reference to FIG. 4) are implemented in software, the method may be stored on any computer readable medium, such as storage 520, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE SIGNS 1 access request
2 client
3 access
4 notification
5 migration
10 network interface controller
11 processing unit
12 mapping unit
13 memory registration logging unit
20 virtual machine
21 virtual memory region
22 operating system
23 hypervisor
30 physical machine
31 physical memory region
40 multiple mapping tables
41, 42, 43 mapping tables
44 memory registration log
50 physical machine
51 physical memory region
401-404 method steps
500 system
501 computerized unit
505 processor
510 memory
511 operating system (OS)
515 memory controller
520 storage
525 display controller
540 display
545, 550, 555 input and/or output (I/O) devices
535 local input/output controller
550 keyboard
555 mouse
560 network interface or transceiver
565 network

What is claimed is:

1. A method for providing a remote direct memory access (RDMA) to a physical memory of a physical machine when a virtual machine is migrated to the physical machine from another physical machine, the method comprising:
   mapping memory region identifiers, each of which is adapted to identify a virtual memory region of the virtual machine and an associated physical memory region of the physical machine, to virtual memory regions and to the associated physical memory regions based on a mapping table that is indexed using a plurality of memory region identifiers, each of the plurality of memory region identifiers being associated with one of the virtual memory regions and one of the physical memory regions,
   wherein, when the virtual machine is migrated to the physical machine from the other physical machine, the mapping table is generated by replaying a memory registration log received from the other physical machine and by replacing, for each memory region identifier of the mapping table, the associated physical memory region of the other physical machine with the associated physical memory region of the physical machine, receiving an access request from a client for accessing one of the physical memory regions being associated with one of the virtual memory regions of the virtual machine, wherein the access request includes one of the plurality of memory region identifiers identifying the virtual memory region and the associated physical memory region, and providing access for the client to the virtual memory region and the associated physical memory region using the information contained in the selected mapping table and using the received memory region identifier.

2. The method of claim 1, wherein the access request is a receive request or a transmit request.

3. The method of claim 1, further comprising generating a new memory registration log responsive to the access request, and transmitting the new memory registration log to a third physical machine when the virtual machine is migrated from the physical machine to the third physical machine.

4. A non-transitory computer readable medium comprising computer executable instructions which when executed by a computer cause the computer to perform a method for providing a remote direct memory access (RDMA) to a physical memory of a physical machine when a virtual machine is migrated to the physical machine from another physical machine, the method comprising:

mapping memory region identifiers, each of which is adapted to identify a virtual memory region of the virtual machine and an associated physical memory region of the physical machine, to virtual memory regions and to the associated physical memory regions based on a mapping table that is indexed using a plurality of memory region identifiers, each of the plurality of memory region identifiers being associated with one of the virtual memory regions and one of the physical memory regions, wherein, when the virtual machine is migrated to the physical machine from the other physical machine, the mapping table is generated by replaying a memory registration log received from the other physical machine and by replacing, for each memory region identifier of the mapping table, the associated physical memory region of the other physical machine with the associated physical memory region of the physical machine, receiving an access request from a client for accessing one of the physical memory regions being associated with one of the virtual memory regions of the virtual machine, wherein the access request includes one of the plurality of memory region identifiers identifying the virtual memory region and the associated physical memory region, and providing access for the client to the virtual memory region and the associated physical memory region using the information contained in the selected mapping table and using the received memory region identifier.

5. The computer readable medium of claim 4, wherein the access request is a receive request or a transmit request.

6. The computer readable medium of claim 4, wherein the method further comprises generating a new memory registration log responsive to the access request, and transmitting the new memory registration log to a third physical machine when the virtual machine is migrated from the physical machine to the third physical machine.

* * * * *